United States Patent Office 3,427,155
Patented Feb. 11, 1969

3,427,155
BRAZING ALLOY
Charles W. Fox, Kokomo, Ind., and Gerald M. Slaughter, Oak Ridge, Tenn., assignors to the United States of America as represented by the United States Atomic Energy Commission
No Drawing. Filed May 3, 1967, Ser. No. 637,043
U.S. Cl. 75—170                                  4 Claims
Int. Cl. C22c 39/44, 39/20

ABSTRACT OF THE DISCLOSURE

An alloy consisting of nickel, germanium, iron, and either or both chromium and silicon useful in brazing stainless steels and high nickel alloys.

BACKGROUND OF THE INVENTION

The invention described herein was made in the course of, or under, a contract with the United States Atomic Energy Commission.

Our invention relates to brazing alloys and particularly to nickel-base brazing alloys useful in joining stainless steel and high-nickel alloy bodies.

Stainless steels and nickel-base alloys are useful structural materials in nuclear reactors and associated equipment because of their high strength and resistance to oxidation and corrosion. In order to get maximum advantage of these properties the brazing alloy used to join structural members must also have equivalent properties and it is desirable that it flow at a temperature no greater than about 1100° C. Brazing alloys which have been used to join stainless steels or nickel-base alloys either flow at an undesirably high temperature, producing severe grain growth in stainless steels, or contain metals such as boron, phosphorus, gold, copper, and palladium which should be avoided in nuclear reactors or in systems where they may be in contact with a liquid metal. Gold, copper, and palladium have poor corrosion resistance to liquid metals; boron exposed to a neutron flux is converted into helium which may cause porosity in the joint; and phosphorus-containing alloys have an unduly low melting point for many applications (~880° C.) and may promote stress-corrosion cracking on some base metals.

SUMMARY OF THE INVENTION

It is accordingly one object of our invention to provide an improved brazing alloy useful in joining stainless steels and nickel-base alloys.

It is another object to provide such a brazing alloy suitable for use in a neutron field.

It is another object of this invention to provide a brazing alloy which flows in the temperature range of 1000° to 1100° C.

Other objects of our invention will be apparent from the following description and the attached claims.

In accordance with our invention we have provided a nickel-base brazing alloy consisting essentially of, by weight, 50 to 70 percent nickel, 20 to 30 percent germanium, 5 to 15 percent iron, and at least one member of the group consisting of chromium and silicon in the amounts of 5 to 10 percent chromium and 2 to 5 percent silicon.

A brazing alloy having this composition melts in the range of 1000° to 1100° C., forms exceptionally high strength joints, and has excellent characteristics for use in a neutron field.

DESCRIPTION OF THE PREFERRED EMBODIMENTS

Representative examples of alloys of our invention are presented in Table I below.

TABLE I

| Alloy No. | Percent by weight | | | | |
|---|---|---|---|---|---|
| | Ni | Ge | Cr | Fe | Si |
| 1 | 65 | 25 | 5 | 5 | |
| 2 | 60 | 25 | 10 | 5 | |
| 3 | 60 | 25 | 5 | 10 | |
| 4 | 55 | 25 | 10 | 10 | |
| 5 | 60 | 30 | 5 | 5 | |
| 6 | 55 | 30 | 10 | 5 | |
| 7 | 65 | 20 | 5 | 5 | 5 |
| 8 | 55 | 25 | 10 | 5 | 5 |
| 9 | 57 | 25 | 10 | 5 | 3 |
| 10 | 57 | 30 | 5 | 5 | 3 |
| 11 | 52 | 30 | 10 | 5 | 3 |
| 12 | 70 | 20 | | 5 | 5 |

It should be noted that nickel, germanium, and iron must be present and the alloy may contain either or both chromium and silicon, but at least one of these two elements must be present.

The alloy may be made by any method capable of producing alloys having a melting temperature within the range of 1000° C. to 1100° C. The alloys in Table I were made by weighing out the required ingredients, preferably in powder or finely divided form, and then arc melting the resultant mixture in an inert atmosphere, such as argon.

The following example is offered to illustrate our invention in more detail.

Example

Brazed joints were made from 316 stainless steel coupons with Alloys Nos. 1, 7, and 12 from Table I. The joints were made by placing one stainless steel coupon normal to the centerface of a second coupon so that a cross section of the two would appear as an inverted T. A small quantity of brazing alloy was placed at the junction of the two coupons and the specimen held at brazing temperature in an atmosphere of dry hydrogen for a period of 10 minutes.

Inspection of the brazed joints established that the alloys had flowed and wet the joint with little reaction between the stainless steel and the brazing alloy. The brazed specimens were tested for shear strength at room temperature and at a temperature of 815° C. The results of these tests are given in Table II.

TABLE II

| Alloy No. | Flow temp., ° C. | Test temp., ° C. | Shear strength, p.s.i. | Shear strength after exposure of 1,000 hours at 840° C., p.s.i. |
|---|---|---|---|---|
| 1 | 1,090 | 20 / 815 | 32,500 / 9,000 | 49,950 |
| 7 | 1,060 | 20 / 815 | 37,250 / 14,500 | 40,000 |
| 12 | 1,090 | 20 / 815 | 34,100 / 14,000 | 49,000 |

As can be seen from Table II, the joints formed using our brazing alloy have excellent strength at room temperature and at an extremely high temperature, and the strength increases after exposure to elevated temperatures.

We claim:

1. A brazing alloy consisting esesntially of, by weight, 50 to 70 percent nickel, 20 to 30 percent germanium, 5 to 15 percent iron, and at least one member of the group consisting of chromium and silicon in the amounts of 5 to 10 percent chromium and 2 to 5 percent silicon.

2. The brazing alloy of claim 1 containing 5 to 10 percent chromium and 2 to 5 percent silicon.

3. The brazing alloy of claim 1 containing 5 to 10 percent chromium and up to 5 percent silicon.

4. The brazing alloy of claim 1 containing up to 10 percent chromium and 2 to 5 percent silicon.

References Cited

UNITED STATES PATENTS

| | | | |
|---|---|---|---|
| 2,901,347 | 8/1959 | McGurty et al. | 75—171 |
| 3,098,743 | 7/1963 | Mobley | 75—171 |
| 3,110,588 | 11/1963 | Mobley | 75—171 |

RICHARD O. DEAN, *Primary Examiner.*

U.S. Cl. X.R.

75—171